C. R. Abbot.
Steam-Pipe for Connecting Heating-Pipes in R.R. Cars
Nº 72258        Patented Dec. 17, 1867.
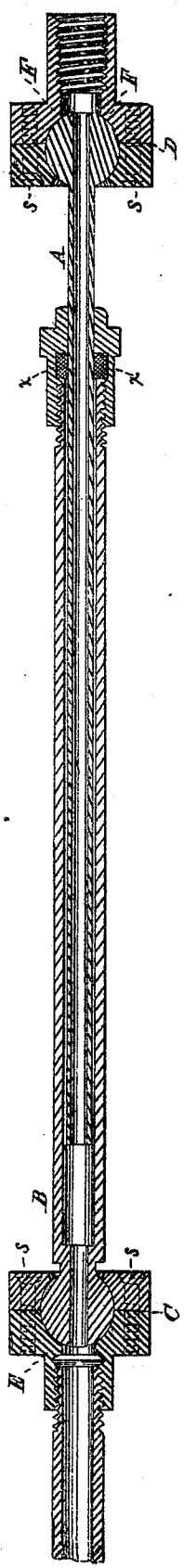
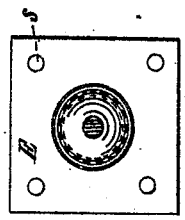
Witnesses.             Inventor.

United States Patent Office.

CHARLES R. ABBOT, OF ELMIRA, NEW YORK.

Letters Patent No. 72,258, dated December 17, 1867.

---

FLEXIBLE STEAM-PIPE FOR CONNECTING HEATING-PIPES IN RAILROAD-CARS.

---

*The Schedule referred to in these Letters Patent and making part of the same.*

---

TO ALL WHOM IT MAY CONCERN:

Be it known that I, CHARLES R. ABBOT, of Elmira, in the county of Chemung, and in the State of New York, have invented certain new and useful Improvements in "Flexible Steam-Pipes" for Connecting and Heating Railway-Cars, and for other purposes; and I do hereby declare that the following is a full, clear, and exact description thereof, reference being had to the accompanying drawing forming a part of this specification.

The drawing represents a longitudinal section through two or more flexible steam-pipes, so arranged as to connect and heat railway passenger-cars.

My invention consists in providing two steam (or fluid) pipes, which slide in each other, with ball-and-socket joints at their outer ends, so as to render the tubes flexible, so that they may contract or expand; and adapt themselves to the variations of the two objects to which their outer ends may be affixed, such as two railway-cars, intended to be heated by steam from the locomotive-boiler. In the drawing—

A and B represent the two steam-pipes, the pipe A sliding closely in pipe B, which may be provided with suitable packing at $x$. C and D are two ball-and-socket joints at the outer ends of pipes A and B, and they consist of suitable "balls," formed at the ends of said pipes, fitting in suitable ground or packed sockets, as shown. The screws $s$ $s$ serve to tighten the packing of the socket-joints C and D. E represents the short joint or sleeve, for connecting to the main pipe of locomotive or other boiler. F represents short joint or sleeve, which enters the car or other place.

Several sets of these pipes may be arranged, as well as one set, for conveying steam for heating cars, or other places, and also for conveying fluids, as in breweries and tanneries. Many times this invention may be well adapted to places where it is desirable to avoid the dangers of contraction and expansion, or to save the trouble or inaccuracy of making a mitre joint in plumbing, steam or gas-fitting.

Having described my invention, what I claim as new, and desire to secure by Letters Patent, is—

The combination and arrangement of pipes A and B, ball-and-socket joints C and D, and pipes E and F, substantially as and for the purposes described.

In testimony that I claim the above-described invention, I have hereunto signed my name, this      day of July, 1867.

CHARLES R. ABBOT.

Witnesses:
ABRAM MINIER,
SOLOMON MINIER.